United States Patent
Cao et al.

(10) Patent No.: US 10,923,761 B2
(45) Date of Patent: Feb. 16, 2021

(54) LITHIUM-ION BATTERY

(71) Applicant: CONTEMPORARY AMPEREX TECHNOLOGY CO., LIMITED, Ningde (CN)

(72) Inventors: Jiao Cao, Ningde (CN); Qifan Zou, Ningde (CN); Guangbo Lu, Ningde (CN); Shengwei Wang, Ningde (CN); Wenzhu Xu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 100 days.

(21) Appl. No.: 16/272,917

(22) Filed: Feb. 11, 2019

(65) Prior Publication Data
US 2020/0006801 A1   Jan. 2, 2020

(30) Foreign Application Priority Data
Jun. 29, 2018 (CN) .......................... 2018 1 0695585

(51) Int. Cl.
| | |
|---|---|
| *H01M 4/00* | (2006.01) |
| *H01M 10/0525* | (2010.01) |
| *H01M 4/505* | (2010.01) |
| *H01M 4/525* | (2010.01) |
| *H01M 4/583* | (2010.01) |
| *H01M 4/02* | (2006.01) |

(52) U.S. Cl.
CPC ....... *H01M 10/0525* (2013.01); *H01M 4/505* (2013.01); *H01M 4/525* (2013.01); *H01M 4/583* (2013.01); *H01M 2004/021* (2013.01)

(58) Field of Classification Search
CPC ................ H01M 4/525; H01M 4/133; H01M 2004/027; H01M 2004/021; H01M 4/131; H01M 2004/028; H01M 10/0525; H01M 4/587

See application file for complete search history.

(56) References Cited

U.S. PATENT DOCUMENTS

| | | | | |
|---|---|---|---|---|
| 2007/0298322 | A1* | 12/2007 | Yamamoto ............ | H01M 4/628 429/218.1 |
| 2014/0227588 | A1 | 8/2014 | Kim et al. | |
| 2017/0207455 | A1* | 7/2017 | Watanabe ............... | C23C 16/56 |

FOREIGN PATENT DOCUMENTS

| | | |
|---|---|---|
| CN | 1830104 A | 9/2006 |
| CN | 100426583 C | 10/2008 |
| CN | 102148364 A | 8/2011 |
| CN | 102362380 A | 2/2012 |
| CN | 103314471 A | 9/2013 |
| CN | 104704658 A | 6/2015 |
| CN | 107403905 A | 11/2017 |
| EP | 2975677 A1 | 1/2016 |
| EP | 3322023 A1 | 5/2018 |
| JP | 2016081757 A | 5/2016 |
| WO | WO-2018093092 A1 | 5/2018 |

OTHER PUBLICATIONS

Contemporary Amperex Technology Co., Limited, Extended European Search Report, EP19156065.5, dated Jun. 12, 2019, 9 pgs.
Contemporary Amperex Technology Co., Limited, The First Office Action, CN201910295388.5, dated Oct. 29, 2019, 8 pgs.
Contemporary Amperex Technology Co., Limited, First Office action, CN201810695585.1, dated Dec. 21, 2018, 6 pgs.

* cited by examiner

*Primary Examiner* — Cynthia H Kelly
*Assistant Examiner* — Monique M Wills
(74) *Attorney, Agent, or Firm* — Morgan, Lewis & Bockius LLP

(57) ABSTRACT

The present disclosure provides a lithium-ion battery, and the lithium-ion battery comprises a positive electrode plate, a negative electrode plate, a separator and an electrolyte. The positive active material comprises a material with a chemical formula of $Li_aNi_xCo_yM_{1-x-y}O_2$, the negative active material comprises graphite, the OI value of the positive film represented by $OI_c$ and the OI value of the negative film represented by $OI_a$ satisfy a relationship: $0.05 \leq OI_a/OI_c \leq 10$. By reasonably matching the OI value of the positive film represented by $OI_c$ and the OI value of the negative film represented by $OI_a$ and making $OI_a/OI_c$ between 0.05 and 10, the dynamics performance of the positive electrode plate and the dynamics performance of the negative electrode plate can achieve an optimal match, the lithium-ion battery can have higher charging capability, and also have excellent cycle life and excellent safety performance during the long-term fast charging use.

20 Claims, No Drawings

LITHIUM-ION BATTERY

CROSS-REFERENCE TO RELATED APPLICATIONS

The present application claims priority to Chinese patent application No. CN201810695585.1, filed on Jun. 29, 2018, which is incorporated herein by reference in its entirety.

FIELD OF THE PRESENT DISCLOSURE

The present disclosure relates to the field of battery, and particularly relates to a lithium-ion battery.

BACKGROUND OF THE PRESENT DISCLOSURE

In recent years, environmental problems and economic problems of fuel caused by oil-fueled automotives have attracted more and more attention, people have urgent desire for a green, environmentally-friendly and economical new energy automotive to alleviate the environmental problems and the economic problems caused by the oil-fueled automotives. A lithium-ion battery has become an indispensable part of the new energy automotives due to advantages such as high voltage, high energy density, long cycle life, low self-discharge, no pollution and the like. The lithium-ion battery is the heart of the new energy automotives, and charge speed and cycle life of the lithium-ion battery directly determine experience of users on the new energy automotives, therefore the lithium-ion battery having safe and fast charging capability and long cycle life have always been hotspots for research and improvement.

The performances of the lithium-ion battery are closely related with the positive active material and the negative active material used, and selecting high quality positive active material and high quality negative active material has a critical effect on ensuring that the lithium-ion battery has high safety performance, high charging speed and long-term cycle reliability. In order to achieve a large charging speed, existing technologies usually employ to reduce the coating weight, increase the amount of the conductive agent and the like, however, these methods usually significantly decrease the energy density of the lithium-ion battery, and it is difficult to meet the requirements on the endurance mileage of the lithium-ion battery. If a fast charging is performed on a lithium-ion battery which does not have fast charging capability, lithium dendrites are easily grown on the surface of the negative electrode plate, and the capacity of the lithium-ion battery is lost greatly. Moreover, the lithium dendrite with the continual growth may also puncture the separator during the use of the lithium-ion battery, which will bring a safety hazard to the lithium-ion battery.

SUMMARY OF THE PRESENT DISCLOSURE

In view of the problem existing in the background, an object of the present disclosure is to provide a lithium-ion battery, which can make the lithium-ion battery have higher charging capability, and also make the lithium-ion battery have excellent cycle life and excellent safety performance during the long-term fast charging use.

In order to achieve the above object, the present disclosure provides a lithium-ion battery, which comprises a positive electrode plate, a negative electrode plate, a separator and an electrolyte, the positive electrode plate comprises a positive current collector and a positive film, the positive film is provided on at least one surface of the positive current collector and comprises a positive active material, the negative electrode plate comprises a negative current collector and a negative film, the negative film is provided on at least one surface of the negative current collector and comprises a negative active material. The positive active material comprises a material with a chemical formula of $Li_aNi_xCo_yM_{1-x-y}O_2$, M is one or two selected from Al and Mn, $0.95 \le a \le 1.2$, $0<x<1$, $0<y<1$, $0<x+y<1$, the negative active material comprises graphite, an OI value of the positive film represented by $OI_c$ and an OI value of the negative film represented by $OI_a$ satisfy a relationship: $0.05 \le OI_a/OI_c \le 10$.

Compared with the existing technologies, the present disclosure includes at least following beneficial effects: in the present disclosure, by reasonably matching the OI value of the positive film represented by $OI_c$ and the OI value of the negative film represented by $OI_a$ and making $OI_a/OI_c$ between 0.05 and 10, the dynamics performance of the positive electrode plate and the dynamics performance of the negative electrode plate can achieve an optimal match during the fast charging process of the lithium-ion battery, the lithium-ion battery can have higher charging capability, and also have excellent cycle life and excellent safety performance during the long-term fast charging use.

DETAILED DESCRIPTION

Hereinafter a lithium-ion battery according to the present disclosure is described in detail.

The lithium-ion battery of the present disclosure comprises a positive electrode plate, a negative electrode plate, a separator and an electrolyte, the positive electrode plate comprises a positive current collector and a positive film, the positive film is provided on at least one surface of the positive current collector and comprises a positive active material, the negative electrode plate comprises a negative current collector and a negative film, the negative film is provided on at least one surface of the negative current collector and comprises a negative active material. The positive active material comprises a material with a chemical formula of $Li_aNi_xCo_yM_{1-x-y}O_2$, M is one or two selected from Al and Mn, $0.95 \le a \le 1.2$, $0<x<1$, $0<y<1$, $0<x+y<1$, the negative active material comprises graphite, an OI value of the positive film represented by $OI_c$ and an OI value of the negative film represented by $OI_a$ satisfy a relationship: $0.05 \le OI_a/OI_c \le 10$.

The OI value of the positive film is defined as $OI_c = C_{003}/C_{110}$, $C_{003}$ represents a characteristic diffraction peak area of (003) crystal plane in X-ray diffraction pattern of the positive electrode plate, $C_{110}$ represents a characteristic diffraction peak area of (110) crystal plane in X-ray diffraction pattern of the positive electrode plate.

The OI value of the negative film is defined as $OI_a = C_{004}/C_{110}$, $C_{004}$ represents a characteristic diffraction peak area of (004) crystal plane in X-ray diffraction pattern of the negative electrode plate, $C_{110}$ represents a characteristic diffraction peak area of (110) crystal plane in X-ray diffraction pattern of the negative electrode plate.

The OI value of the positive film may reflect the orientation degree of the stacked positive active material particles in the positive film, the OI value of the negative film may reflect the orientation degree of the stacked negative active material particles in the negative film. The lithium ions deintercalate from the positive active material and intercalate into the negative active material during the charging process, therefore the OI value of the positive film and the OI value of the negative film both have a significant effect on the charging speed and the cycle life of the lithium-ion battery.

If the OI value of the positive film is small and the OI value of the negative film is large, the preferred orientation of the positive active material particles occurs in the positive film and is perpendicular to the positive current collector, and the preferred orientation of the negative active material particles occurs in the negative film and is parallel to the negative current collector. When a fast charging is performed on the lithium-ion battery in this case, the lithium ions can deintercalate from the positive active material with a fast speed, however, the lithium ions are unable to timely intercalate into the negative active material, a part of the lithium ions will be directly reduced and precipitated on the surface of the negative electrode plate to form lithium dendrite, the capacity of the lithium-ion battery will be deceased. Moreover, the lithium dendrite with the continual growth will also puncture the separator during the charge-discharge cycle process of the lithium-ion battery and result in a larger safety hazard; the continual growth of the lithium dendrite will also consume too much lithium ions, and the capacity of the lithium-ion battery during the cycle process will decay too fast.

If the OI value of the positive film is large and the OI value of the negative film is small, the preferred orientation of the positive active material particles occurs in the positive film and is parallel to the positive current collector, and the preferred orientation of the negative active material particles occurs in the negative film and is perpendicular to the negative current collector. When a fast charging is performed on the lithium-ion battery in this case, although the negative active material has the capability to quickly accept the lithium ions, however, the lithium ions are very difficult to deintercalate from the positive active material smoothly, the polarization of the lithium-ion battery becomes increasing during the fast charging process, and the charging speed of the lithium-ion battery continually decreases, finally the lithium-ion battery can only be charged under a small current, thereby affecting the dynamics performance of the lithium-ion battery.

Therefore, by reasonably matching the OI value of the positive film represented by $OI_c$ and the OI value of the negative film represented by $OI_a$ and making $OI_a/OI_c$ between 0.05 and 10, the dynamics performance of the positive electrode plate and the dynamics performance of the negative electrode plate can achieve an optimal match during the fast charging process of the lithium-ion battery, the lithium-ion battery can have higher charging capability, and also have excellent cycle life and excellent safety performance during the long-term fast charging use.

Preferably, the OI value of the positive film represented by $OI_c$ and the OI value of the negative film represented by $OI_a$ satisfy a relationship: $0.1 \leq OI_a/OI_c \leq 6$; more preferably, the OI value of the positive film represented by $OI_c$ and the OI value of the negative film represented by $OI_a$ satisfy a relationship: $0.2 \leq OI_a/OI_c \leq 3$.

In the lithium-ion battery of the present disclosure, preferably, the OI value of the positive film represented by $OI_c$ is 3~100; more preferably, the OI value of the positive film represented by $OI_c$ is 5~80. When the OI value of the positive film falls within the above preferred range thereof, the lithium ions are more easily deintercalated from and intercalated into the active sites on the surface of the positive active material so as to further improve the transmission speed of the lithium ions and further improve the charging capability and the cycle life of the lithium-ion battery.

In the lithium-ion battery of the present disclosure, preferably, the OI value of the negative film represented by $OI_a$ is 4~50; more preferably, the OI value of the negative film represented by $OI_a$ is 5~30. When the OI value of the negative film falls within the above preferred range thereof, the lithium ions are more easily intercalated into and deintercalated from the active sites on the surface of the negative active material so as to further improve the transmission speed of the lithium ions and further improve the charging capability and the cycle life of the lithium-ion battery.

In the lithium-ion battery of the present disclosure, an OI value of a powder of the active material and the particle size of the active material in the film (i.e. the positive film and the negative film) both will affect the OI value of the film, therefore the OI value of the film can be adjusted by selecting appropriate active material.

Preferably, an OI value of a powder of the positive active material represented by $G_{OI}$ is 3~15; more preferably, the OI value of the powder of the positive active material represented by $G_{OI}$ is 5~10. Preferably, the OI value of the powder of the negative active material represented by $V_{OI}$ is 2~15; more preferably, the OI value of the powder of the negative active material represented by $V_{OI}$ is 2~11. When the OI value of the powder of the positive active material falls within the above preferred range thereof and the OI value of the powder of the negative active material falls within the above preferred range thereof, the positive active material and the negative active material can have better isotropy, which is more beneficial for deintercalation and intercalation of the lithium ions.

Preferably, an average particle diameter D50 of the positive active material is 3 μm~20 μm; more preferably, the average particle diameter D50 of the positive active material is 3 μm~12 μm. Preferably, an average particle diameter D50 of the negative active material is 1 μm~25 μm; more preferably, the average particle diameter D50 of the negative active material is 4 μm~15 μm. When the particle size of the positive active material falls within the above preferred range thereof and the particle size of the negative active material falls within the above preferred range thereof, the positive film and the negative film can have better homogeneity, thereby preventing the active material (i.e. the positive active material and the negative active material) with too small particle size from affecting the performances of the lithium-ion battery by generating more side reactions with the electrolyte, and also preventing the active material with too large particle size from affecting the performances of the lithium-ion battery by hindering the transmission of the lithium ions inside the active material.

In the lithium-ion battery of the present disclosure, cold pressing parameters (such as cold pressing speed, cold pressing temperature, cold pressing pressure, cold pressing times and the like) of the positive electrode plate and the negative electrode plate will also affect the orientation degree of the stacked particles in the film (i.e. the positive film and the negative film) and further affect the OI value of the film (i.e. the positive film and the negative film), therefore the OI value of the film (i.e. the positive film and the negative film) can also be adjusted by controlling the cold pressing parameters of the electrode plate (i.e. the positive electrode plate and the negative electrode plate).

Preferably, a pressing density of the positive film is 2.0 g/cm$^3$~4.4 g/cm$^3$; more preferably, the pressing density of the positive film is 3.0 g/cm$^3$~3.5 g/cm$^3$. Preferably, a pressing density of the negative film is 0.8 g/cm$^3$~2.0 g/cm$^3$; more preferably, the pressing density of the negative film is 1.0 g/cm$^3$~1.6 g/cm$^3$. When the pressing density of the positive film falls within the above preferred range thereof and the pressing density of the negative film falls within the above preferred range thereof, the integrity of the positive active material particle is higher and the integrity of the negative active material particle is higher, and the electrical contact between the positive active material particles are better and the electrical contact between the negative active material particles are better.

In the lithium-ion battery of the present disclosure, the OI value of the film (i.e. the positive film and the negative film) can also be adjusted by using magnetic field inducing technique during the coating process of a slurry (i.e. a positive slurry and a negative slurry).

In the lithium-ion battery of the present disclosure, the positive active material may further comprise one or more selected from a group consisting of layered $LiMnO_2$, spinel $LiMn_2O_4$, $LiNi_xMn_{2-x}O_4$ ($0<x<2$), $LiCoO_2$ and $LiFePO_4$ besides $Li_aNi_xCo_yM_{1-x-y}O_2$.

In the lithium-ion battery of the present disclosure, doping modification and/or coating modification may be further performed on the above positive active material (such as $Li_aNi_xCo_yM_{1-x-y}O_2$ and the like).

The doping modification may be cation doping, anion doping or anion-cation complex doping, the purpose of the doping modification is to dope some cations, anions or complex ions into the crystal lattice of the positive active material so as to reduce cation mixing, it is beneficial for reducing the first cycle irreversible capacity, particularly making the integrity of the layered structure of $Li_aNi_xCo_yM_{1-x-y}O_2$ more complete and making the stability of the crystal structure of $Li_aNi_xCo_yM_{1-x-y}O_2$ higher, therefore the probability of particles break and the probability of crystal structure damage are lower, which is beneficial for improving the cycle performance and the thermal stability of the lithium-ion battery. The specific method of the doping modification is not limited, for example, a wet doping may be used in the coprecipitation stage of the precursor, or a dry doping may be used in the sintering stage.

Preferably, an element used in the cation doping may be one or more selected from a group consisting of Al, Zr, Ti, B, Mg, V, Cr, Zn and Y.

Preferably, an element used in the anion doping may be one or more selected from a group consisting of F, P and S, F is more preferable. F may not only promote the sintering of the positive active material so as to make the structure of the positive active material more stable, but also may stabilize the interface between the positive active material and the electrolyte during the cycle process, therefore it is beneficial for improving the cycle performance of the lithium-ion battery.

Preferably, a total doping amount of the cations and the anions is not more than 20%.

The coating modification is to form a coating layer on the surface of the positive active material so as to separate the electrolyte and the positive active material and prevent the electrolyte from directly contacting the positive active material, which may reduce the side reactions between electrolyte and the positive active material to a large extent, reduce the dissolution of the transition metals inside the positive active material, and improve the electrochemical stability of the positive active material. The presence of the coating layer may also inhibit the collapse of the crystal structure of the positive active material during the repeated charge-discharge cycles, reduce the probability of particle break and the probability of crystal structure damage, therefore it is beneficial for improving the cycle performance of the lithium-ion battery. The specific method of the coating modification is not limited, for example, a wet coating may be used in the coprecipitation stage of the precursor, or a dry coating may be used in the sintering stage.

Preferably, the coating layer may be one or more selected from a group consisting of a carbon layer, a graphene layer, an oxide layer, an inorganic salt layer and a conductive polymer layer. The oxide may be an oxide formed from one or more selected from a group consisting of Al, Ti, Mn, Zr, Mg, Zn, Ba, Mo and B; the inorganic salt may be one or more selected from a group consisting of $Li_2ZrO_3$, $LiNbO_3$, $Li_4Ti_5O_{12}$, $Li_2TiO_3$, $LiTiO_2$, $Li_3VO_4$, $LiSnO_3$, $Li_2SiO_3$, $LiAlO_2$, $AlPO_4$ and $AlF_3$; the conductive polymer may be polypyrrole (PPy), poly(3,4-ethylenedioxythiophene) (PEDOT) or polyamide (PI).

Preferably, a mass of the coating layer is not more than 20%.

Preferably, $Li_aNi_xCo_yM_{1-x-y}O_2$ may be one or more specifically selected from a group consisting of $LiNi_{1/3}Co_{1/3}Mn_{1/3}O_2$ (NCM333), $LiNi_{0.5}Co_{0.2}Mn_{0.3}O_2$ (NCM523), $LiNi_{0.6}Co_{0.2}Mn_{0.2}O_2$ (NCM622), $LiNi_{0.8}Co_{0.1}Mn_{0.1}O_2$ (NCM811), $LiNi_{0.8}Co_{0.1}Al_{0.1}O_2$ and $LiNi_{0.85}CO_{0.15}Al_{0.05}O_2$.

In the lithium-ion battery of the present disclosure, at least a part of the positive active material is single particle (it means non-agglomerated particle). The positive active material which is single particle may improve the whole pressing density and the extensibility of the positive electrode plate, and also reduce the contact area between the positive active material and the electrolyte, reduce the occurrence of the side reactions at the interface between the positive active material and the electrolyte, reduce the amount of the gas to be generated, thereby further improving the cycle performance of the lithium-ion battery.

In the lithium-ion battery of the present disclosure, the graphite may be one or more selected from a group consisting of artificial graphite, natural graphite and modified graphite. The negative active material may further comprise one or more selected from a group consisting of soft carbon, hard carbon, carbon fiber, mesocarbon microbeads, silicon-based material, tin-based material and lithium titanate besides the graphite. The silicon-based material may be one or more selected from a group consisting of elemental silicon, silicon oxide, silicon carbon composite and silicon alloy, the tin-based material is one or more selected from a group consisting of elemental tin, tin oxide compound and tin alloy.

In the lithium-ion battery of the present disclosure, a type of the positive current collector is not specifically limited and may be selected based on actual demands, for example, the positive current collector may be an aluminum foil, a nickel foil or a polymer conductive film, and preferably, the positive current collector is the aluminum foil.

In the lithium-ion battery of the present disclosure, a type of the negative current collector is not specifically limited and may be selected based on actual demands, for example, the negative current collector may be a copper foil, a carbon coated copper foil or a polymer conductive film, and preferably, the negative current collector is the copper foil.

In the lithium-ion battery of the present disclosure, the positive film further comprises a conductive agent and a binder, the types and the contents of the conductive agent and the binder are not specifically limited and may be selected based on actual demands.

In the lithium-ion battery of the present disclosure, the negative film further comprises a conductive agent and a binder, the types and the contents of the conductive agent and the binder are not specifically limited and may be selected based on actual demands.

In the lithium-ion battery of the present disclosure, the type of the separator is not specifically limited and may be selected based on actual demands, the separator may be any separator used in existing batteries, for example, the separator may be a polyethylene membrane, a polypropylene membrane, a polyvinylidene fluoride membrane and a multilayer composite membrane thereof, but the present disclosure is not limited thereto.

In the lithium-ion battery of the present disclosure, the electrolyte comprises a lithium salt and an organic solvent, the types and the specific components of the lithium salt and the organic solvent are not specifically limited and may be selected based on actual demands. Preferably, the lithium salt may be one or more selected from a group consisting of lithium hexafluorophosphate, lithium tetrafluoroborate and lithium perchlorate, the organic solvent may comprise one or more selected from a group consisting of cyclic carbonate, chain carbonate and carboxylate. The electrolyte may also comprise functional additives, such as vinylene carbonate, ethylene sulfate, propane sultone, fluoroethylene carbonate and the like.

In the lithium-ion battery of the present disclosure, the parameters of the positive active material, the negative active material, the positive electrode plate and the positive electrode plate can be measured as follows, or measured according to other methods known in the art, and the obtained results are both within the error range.

The average particle size D50 of the positive active material and the negative active material may be measured by a laser diffraction particle size analyzer (Mastersizer 3000), the particle size distribution is obtained with the particle size analysis-laser diffraction method (specifically referring to GB/T19077-2016), and the average particle size is represented by the median value D50 of the volume particle size distribution.

The OI value of the powder of the positive active material and the OI value of the positive film may be obtained by a X-ray powder diffractometer (X'pert PRO), a X-ray diffraction pattern is obtained according to the general rules for X-ray diffractometric analysis JIS K 0131-1996, the OI value=$C_{003}/C_{110}$, $C_{003}$ represents characteristic diffraction peak area of (003) crystal plane, $C_{110}$ represents characteristic diffraction peak area of (110) crystal plane. Specifically, the test method of the OI value of the powder of the positive active material comprises steps of: directly placing a certain amount of the powder of the positive active material in an X-ray powder diffractometer, and obtaining characteristic diffraction peak area of (003) crystal plane and characteristic diffraction peak area of (110) crystal plane by X-ray diffractometric analysis, in turn obtaining the OI value of the powder of the positive active material. Specifically, the test method of the OI value of the positive film comprises steps of: directly placing the prepared positive electrode plate in an X-ray powder diffractometer, and obtaining characteristic diffraction peak area of (003) crystal plane and characteristic diffraction peak area of (110) crystal plane by X-ray diffractometric analysis, in turn obtaining the OI value of the positive film.

The OI value of the powder of the negative active material and the OI value of the negative film may be obtained by a X-ray powder diffractometer (X'pert PRO), a X-ray diffraction pattern is obtained according to the general rules for X-ray diffractometric analysis JIS K 0131-1996 and the determination method of artificial graphite lattice parameter JB/T4220-2011, the OI value=$C_{004}/C_{110}$, $C_{004}$ represents characteristic diffraction peak area of (004) crystal plane, $C_{110}$ represents characteristic diffraction peak area of (110) crystal plane. Specifically, the test method of the OI value of the powder of the negative active material comprises steps of: directly placing a certain amount of the powder of the negative active material in an X-ray powder diffractometer, and obtaining characteristic diffraction peak area of (004) crystal plane and characteristic diffraction peak area of (110) crystal plane by X-ray diffractometric analysis, in turn obtaining the OI value of the powder of the negative active material. Specifically, the test method of the OI value of the negative film comprises steps of: directly placing the prepared negative electrode plate in an X-ray powder diffractometer, and obtaining characteristic diffraction peak area of (004) crystal plane and characteristic diffraction peak area of (110) crystal plane by X-ray diffractometric analysis, in turn obtaining the OI value of the negative film.

The pressing density of the positive film and the negative film is defined as PD=m/V, where m represents the weight of the film (i.e. the positive film and the negative film), V represents the volume of the film, and m may be weighed by an electronic balance with an accuracy of 0.01 g or more, the volume V of the film is a product of the surface area of the film and the thickness of the film, and the thickness of the film can be measured by a spiral micrometer with an accuracy of 0.5 μm.

Hereinafter the present disclosure will be described in detail in combination with examples. It should be noted that, the examples described in the present disclosure are only used for explaining the present disclosure, and are not intended to limit the present disclosure.

Lithium-ion batteries of examples 1-20 and comparative examples 1-6 were all prepared in accordance with the following preparation method.

(1) Preparation of a Positive Electrode Plate

The positive active material shown in Table 1, acetylene black (conductive agent) and PVDF (binder) according to a mass ratio of 96:2:2 were uniformly mixed with NMP (solvent), which then became homogeneous under stirring via a vacuum mixer, a positive slurry was obtained; then the positive slurry was uniformly coated on a positive current collector, drying was then performed under room temperature and continual drying was performed in an oven, which was then followed by cold pressing and plate cutting, finally the positive electrode plate was obtained. During the preparation of the positive electrode plate, after a suitable positive active material was selected, the positive films with different OI values could be obtained by appropriately adjusting the cold pressing parameters or additionally using the magnetic field inducing technique.

(2) Preparation of a Negative Electrode Plate

The negative active material shown in Table 1, acetylene black (conductive agent), CMC (thickening agent), SBR (binder) according to a mass ratio of 96.4:1:1.2:1.4 were uniformly mixed with deionized water (solvent), which then became homogeneous under stirring via a vacuum mixer, a negative slurry was obtained; then the negative slurry was uniformly coated on a negative current collector, drying was then performed under room temperature and continual drying was performed in an oven, which was then followed by cold pressing and plate cutting, finally the negative electrode plate was obtained. During the preparation of the negative electrode plate, after a suitable negative active material were selected, the negative films with different OI values could be obtained by appropriately adjusting the cold pressing parameters or additionally using the magnetic field inducing technique.

(3) Preparation of an Electrolyte

Ethylene carbonate (EC), ethyl methyl carbonate (EMC) and diethyl carbonate (DEC) according to a volume ratio of 1:1:1 were mixed together to obtain an organic solvent, then sufficiently dried $LiPF_6$ was dissolved into the mixed organic solvent to obtain an electrolyte, and a concentration of the electrolyte was 1 mol/L.

(4) Preparation of a Separator

The separator was a polyethylene membrane.

(5) Preparation of a Battery

The positive electrode plate, the separator and the negative electrode plate were laminated in order, the separator was positioned between the positive electrode plate and the negative electrode plate so as to separate the positive electrode plate from the negative electrode plate, then the positive electrode plate, the separator and the negative electrode plate were wound together to form an electrode assembly, then the electrode assembly was put into a case, which was followed by baking, electrolyte injection, vacuum packaging, standby, formation, shaping and the like, finally a lithium-ion battery was obtained.

Hereinafter test processes of the lithium-ion batteries were described.

(1) Testing of the Dynamics Performance

At 25° C., the lithium-ion batteries prepared in the examples and the comparative examples were fully charged at a constant current of 4 C and fully discharged at a constant current of 1 C for 10 cycles, then the lithium-ion batteries were fully charged at a constant current of 4 C, then the negative electrode plate was disassembled, and the lithium precipitation on the surface of the negative electrode plate was observed. The lithium-precipitation area of less than 5% was considered to be slight lithium precipitation, the lithium-precipitation area of 5% to 40% was considered to be moderate lithium precipitation, and the lithium-precipitation area of more than 40% was considered to be serious lithium precipitation.

(2) Testing of the Cycle Performance

At 25° C., the lithium-ion batteries prepared in the examples and the comparative examples were charged at a constant current of 3 C and discharged at a constant current of 1 C, the full charge-full discharge cycle was repeated until the capacity of the lithium-ion battery was decayed to 80% of the initial capacity, and the cycle number of the lithium-ion battery was recorded.

TABLE 1

Parameters and testing results of examples 1-20 and comparative examples 1-6

| | Positive active material | | | | Negative active material | | | | | | |
|---|---|---|---|---|---|---|---|---|---|---|---|
| | Type | D50 (μm) | OI value of powder | Pressing density of positive film (g/cm³) | $OI_c$ | Type | D50 (μm) | OI value of powder | Pressing density of negative film (g/cm³) | $OI_a$ | $OI_a/OI_c$ | Dynamics performance | Cycle number at 3 C |
| Example 1 | NCM 523 | 3.0 | 15.0 | 3.1 | 100 | Graphite | 23.2 | 2.2 | 2.00 | 5 | 0.05 | slight lithium precipitation | 2900 |
| Example 2 | NCM 523 | 4.4 | 5.2 | 3.5 | 50 | Graphite | 4.3 | 2.5 | 1.40 | 5 | 0.10 | slight lithium precipitation | 3000 |
| Example 3 | NCM 523 | 9.3 | 7.3 | 2.2 | 80 | Graphite | 1.0 | 10.0 | 0.80 | 40 | 0.50 | no lithium precipitation | 3200 |
| Example 4 | NCM 523 | 7.8 | 7.3 | 3.3 | 28 | Graphite | 9.4 | 6.0 | 1.00 | 15 | 0.54 | no lithium precipitation | 4000 |
| Example 5 | NCM 523 | 4.4 | 6.1 | 2.0 | 20 | Graphite | 12.0 | 3.2 | 1.45 | 12 | 0.60 | no lithium precipitation | 3800 |
| Example 6 | NCM 523 | 20.0 | 9.8 | 4.4 | 40 | Graphite | 15.0 | 15.0 | 1.65 | 50 | 1.25 | no lithium precipitation | 3000 |
| Example 7 | NCM 523 | 3.4 | 4.2 | 3.2 | 10 | Graphite | 14.8 | 4.0 | 1.60 | 20 | 2.00 | no lithium precipitation | 3600 |
| Example 8 | NCM 523 | 14.3 | 7.6 | 3.7 | 10 | Graphite | 20.7 | 6.5 | 1.80 | 23 | 2.30 | no lithium precipitation | 4500 |
| Example 9 | NCM 523 | 8.0 | 4.6 | 2.6 | 8 | Graphite | 11.8 | 5.1 | 1.50 | 30 | 3.75 | slight lithium precipitation | 3500 |
| Example 10 | NCM 523 | 9.0 | 5.0 | 3.5 | 6 | Graphite | 10.2 | 7.3 | 1.55 | 30 | 5.00 | slight lithium precipitation | 3100 |
| Example 11 | NCM 523 | 11.2 | 5.0 | 3.0 | 5 | Graphite | 7.6 | 10.0 | 1.20 | 30 | 6.00 | slight lithium precipitation | 3050 |
| Example 12 | NCM 523 | 8.9 | 3.0 | 3.4 | 3 | Graphite | 9.5 | 15.0 | 1.55 | 30 | 10.00 | slight lithium precipitation | 1600 |
| Example 13 | NCM 523 | 8.2 | 7.3 | 4.0 | 110 | Graphite | 8.9 | 9.0 | 1.35 | 28 | 0.25 | no lithium precipitation | 2800 |
| Example 14 | NCM 523 | 5.0 | 2.0 | 3.5 | 2 | Graphite | 6.4 | 3.4 | 1.30 | 16 | 8.00 | slight lithium precipitation | 2350 |
| Example 15 | NCM 523 | 10.0 | 14.0 | 3.8 | 40 | Graphite | 5.0 | 2.0 | 1.10 | 3 | 0.08 | slight lithium precipitation | 1900 |
| Example 16 | NCM 523 | 8.0 | 5.8 | 3.4 | 6.5 | Graphite | 12.0 | 14.0 | 1.65 | 60 | 9.23 | slight lithium precipitation | 1750 |
| Example 17 | NCM 622 | 12.0 | 5.5 | 3.0 | 7 | Graphite | 8.7 | 4.3 | 1.65 | 15 | 2.14 | no lithium precipitation | 1700 |
| Example 18 | NCM 622 | 8.0 | 7.2 | 3.4 | 23 | Graphite | 5.6 | 14.0 | 0.90 | 34 | 1.48 | no lithium precipitation | 1500 |
| Example 19 | NCM 811 | 11.0 | 4.0 | 2.8 | 6 | Graphite | 5.8 | 8.9 | 1.23 | 22 | 3.67 | no lithium precipitation | 1800 |
| Example 20 | NCM 811 | 14.0 | 6.7 | 3.8 | 15 | Graphite | 9.8 | 4.6 | 1.50 | 26 | 1.73 | no lithium precipitation | 2000 |

TABLE 1-continued

Parameters and testing results of examples 1-20 and comparative examples 1-6

| | Positive active material | | | Pressing density of positive film (g/cm³) | $OI_c$ | Negative active material | | | Pressing density of negative film (g/cm³) | $OI_a$ | $OI_a/OI_c$ | Dynamics performance | Cycle number at 3 C |
|---|---|---|---|---|---|---|---|---|---|---|---|---|---|
| | Type | D50 (μm) | OI value of powder | | | Type | D50 (μm) | OI value of powder | | | | | |
| Comparative example 1 | NCM 523 | 7.0 | 4.3 | 3.3 | 97 | Graphite | 4.7 | 2.0 | 1.55 | 4 | 0.04 | moderate lithium precipitation | 1000 |
| Comparative example 2 | NCM 523 | 9.0 | 3.0 | 3.5 | 4 | Graphite | 7.2 | 7.0 | 1.10 | 46 | 11.50 | serious lithium precipitation | 800 |
| Comparative example 3 | NCM 622 | 15.0 | 9.8 | 4.0 | 98 | Graphite | 6.9 | 2.1 | 1.60 | 4.2 | 0.04 | moderate lithium precipitation | 600 |
| Comparative example 4 | NCM 622 | 10.0 | 3.5 | 3.6 | 4 | Graphite | 6.3 | 13.0 | 1.45 | 42 | 10.50 | serious lithium precipitation | 500 |
| Comparative example 5 | NCM 811 | 11.0 | 12.3 | 3.6 | 96 | Graphite | 9.4 | 2.2 | 1.50 | 4 | 0.04 | moderate lithium precipitation | 550 |
| Comparative example 6 | NCM 811 | 17.0 | 3.2 | 3.9 | 4 | Graphite | 13.5 | 12.0 | 1.53 | 50 | 12.50 | serious lithium precipitation | 450 |

In the examples of the present disclosure, by reasonably matching the OI value of the positive film represented by $OI_c$ and the OI value of the negative film represented by $OI_a$ and making $OI_a/OI_c$ between 0.05 and 10, the dynamics performance of the positive electrode plate and the dynamics performance of the negative electrode plate could achieve the optimal match during the fast charging process of the lithium-ion battery, the lithium-ion battery could have higher charging capability, and also have excellent cycle life during the long-term fast charging use.

In comparative examples 1-6, the ratios between the OI value of the negative film represented by $OI_a$ and the OI value of the positive film represented by $OI_c$ were too large or too small, and they were all not beneficial for obtaining the lithium-ion battery having both excellent dynamics performance and long cycle life.

When the OI value of the positive film represented by $OI_c$ was larger, the OI value of the negative film represented by $OI_a$ was smaller and $OI_a/OI_c$ was less than 0.05, the preferred orientation of the positive active material particles occurred in the positive film and was parallel to the positive current collector, and the preferred orientation of the negative active material particles occurred in the negative film and was perpendicular to the negative current collector. When a fast charging was performed on the lithium-ion battery in this case, although the negative active material had the capability to quickly accept the lithium ions, however, the lithium ions were very difficult to deintercalate from the positive active material smoothly, the battery polarization continually increased and the charging speed continually decreased during the continuous fast charging process, thereby significantly affecting the use of the lithium-ion battery. When the OI value of the positive film represented by $OI_c$ was smaller, the OI value of the negative film represented by $OI_a$ was larger and $OI_a/OI_c$ was more than 10, the preferred orientation of the positive active material particles occurred in the positive film and was perpendicular to the positive current collector, and the preferred orientation of the negative active material particles occurred in the negative film and was parallel to the negative current collector. When a fast charging was performed on the lithium-ion battery in this case, the lithium ions could deintercalate from the positive active material with a fast speed, however, the lithium ions were unable to timely intercalate into the negative active material, a part of the lithium ions would be directly reduced and precipitated on the surface of the negative electrode plate to form lithium dendrite, the capacity of the lithium-ion battery would be deceased. Moreover, the continual growth of the lithium dendrite would also consume too much lithium ions, the capacity of the lithium-ion battery during the long-term fast charging process would decay too fast, and it was difficult to obtain the lithium-ion battery having long cycle life.

In the lithium-ion battery of the present disclosure, the OI value of the positive film represented by $OI_c$ preferably was 3~100, the OI value of the negative film represented by $OI_a$ preferably was 4~50, when they each fell within the above preferred range thereof, it was more beneficial for the deintercalation and the intercalation of the lithium ions, and more beneficial for improving the charging capability of the lithium-ion battery and extending the cycle life of the lithium-ion battery. However, when the OI value of the positive film represented by $OI_c$ or the OI value of the negative film represented by $OI_a$ did not fall within the above preferred range thereof but $OI_a/OI_c$ was between 0.05 and 10, the lithium-ion battery still had excellent dynamics performance compared with examples 13-16, and had longer cycle life compared with the prior art. More preferably, the OI value of the positive film represented by $OI_c$ was 5~80, the OI value of the negative film represented by $OI_a$ was 5~30.

According to the foregoing disclosure and teaching of the present disclosure, a person skilled in the art may also make appropriate variations and modifications to the above implementing manners. Therefore, the present disclosure is not limited to the specific implementing manners disclosed and described in the above, modifications and variations of the present disclosure will also be fallen within the scope of the appended claims of the present disclosure. Furthermore, although specific terminologies are used in the present disclosure, these terminologies are merely for convenience of description, and are not intended to limit the present disclosure.

What is claimed:

1. A lithium-ion battery comprising a positive electrode plate, a negative electrode plate, a separator and an electrolyte, the positive electrode plate comprising a positive current collector and a positive film, the positive film being provided on at least one surface of the positive current collector and comprising a positive active material, the negative electrode plate comprising a negative current collector and a negative film, the negative film being provided on at least one surface of the negative current collector and comprising a negative active material;

wherein the positive active material comprises a material with a chemical formula of $Li_aNi_xCo_yM_{1-x-y}O_2$, M is one or two selected from Al and Mn, $0.95 \leq a \leq 1.2$, $0<x<1$, $0<y<1$, $0<x+y<1$;

the negative active material comprises graphite;

an OI value of the positive film represented by $OI_c$ and an OI value of the negative film represented by $OI_a$ satisfy a relationship: $0.05 \leq OI_a/OI_c \leq 10$;

$OI_c = C_{003}/C_{110}$, $C_{003}$ represents characteristic diffraction peak area of (003) crystal plane in X-ray diffraction pattern of the positive film, $C_{110}$ represents characteristic diffraction peak area of (110) crystal plane in X-ray diffraction pattern of the positive film;

$OI_a = C_{004}/C_{110}$, $C_{004}$ represents characteristic diffraction peak area of (004) crystal plane in X-ray diffraction pattern of the negative film, $C_{110}$ represents characteristic diffraction peak area of (110) crystal plane in X-ray diffraction pattern of the negative film; and the OI value of the positive film represented by $OI_c$ is 5~80.

2. The lithium-ion battery according to claim 1, wherein the OI value of the positive film represented by $OI_c$ and the OI value of the negative film represented by $OI_a$ satisfy a relationship: $0.2 \leq OI_a/OI_c \leq 3$.

3. The lithium-ion battery according to claim 1, wherein the OI value of the negative film represented by $OI_a$ is 5~30.

4. The lithium-ion battery according to claim 1, wherein an average particle diameter D50 of the positive active material is 3 μm~12 μm;

an average particle diameter D50 of the negative active material is 4 μm~15 μm.

5. The lithium-ion battery according to claim 1, wherein an OI value of a powder of the positive active material represented by $G_{OI}$ is 3~15;

an OI value of a powder of the negative active material represented by $V_{OI}$ is 2~15;

$G_{OI} = C'_{003}/C'_{110}$, $C'_{003}$ represents characteristic diffraction peak area of (003) crystal plane in X-ray diffraction pattern of the powder of the positive active material, $C'_{110}$ represents characteristic diffraction peak area of (110) crystal plane in X-ray diffraction pattern of the powder of the positive active material; and $V_{OI} = C'_{004}/C'_{110}$, $C'_{004}$ represents characteristic diffraction peak area of (004) crystal plane in X-ray diffraction pattern of the powder of the negative active material, $C'_{110}$ represents characteristic diffraction peak area of (110) crystal plane in X-ray diffraction pattern of the powder of the negative active material.

6. The lithium-ion battery according to claim 5, wherein the OI value of a powder of the positive active material represented by $G_{OI}$ is 5~10;

the OI value of a powder of the negative active material represented by $V_{OI}$ is 2~11.

7. The lithium-ion battery according to claim 1, wherein the pressing density of the positive film is 3.0 g/cm³~3.5 g/cm³;

the pressing density of the negative film is 1.0 g/cm³~1.6 g/cm³.

8. The lithium-ion battery according to claim 1, wherein the positive active material further comprises one or more selected from a group consisting of layered $LiMnO_2$, spinel $LiMn_2O_4$, $LiNi_xMn_{2-x}O_4$, $LiCoO_2$ and $LiFePO_4$, $0<x<2$.

9. The lithium-ion battery according to claim 1, wherein doping modification and/or coating modification is further performed on the positive active material.

10. The lithium-ion battery according to claim 1, wherein the negative active material further comprises one or more selected from a group consisting of soft carbon, hard carbon, carbon fiber, mesocarbon microbeads, silicon-based material, tin-based material and lithium titanate.

11. The lithium-ion battery according to claim 2, wherein the OI value of the positive film represented by $OI_c$ and the OI value of the negative film represented by $OI_a$ satisfy a relationship: $0.2 \leq OI_a/OI_c \leq 0.60$.

12. The lithium-ion battery according to claim 3, wherein the OI value of the positive film represented by $OI_c$ is 10~80.

13. The lithium-ion battery according to claim 12, wherein the OI value of the positive film represented by $OI_c$ is 15~80.

14. The lithium-ion battery according to claim 13, wherein the OI value of the positive film represented by $OI_c$ is 28~50.

15. The lithium-ion battery according to claim 3, wherein the OI value of the negative film represented by $OI_a$ is 12~30.

16. The lithium-ion battery according to claim 15, wherein the OI value of the negative film represented by $OI_a$ is 15~30.

17. The lithium-ion battery according to claim 4, wherein the average particle diameter D50 of the positive active material is 3 μm~7.8 μm;

and/or, the average particle diameter D50 of the negative active material is 4 μm~12 μm.

18. The lithium-ion battery according to claim 7, wherein the pressing density of the positive film is 3.3 g/cm³~3.5 g/cm³;

and/or, the pressing density of the negative film is 1.40 g/cm³~1.6 g/cm³.

19. The lithium-ion battery according to claim 1, wherein the positive active material comprises one or more selected from a group consisting of $LiNi_{0.5}Co_{0.2}Mn_{0.3}O_2$, $LiNi_{0.6}Co_{0.2}Mn_{0.2}O_2$, $LiNi_{0.8}Co_{0.1}Mn_{0.1}O_2$, $LiNi_{0.8}Co_{0.1}Al_{0.1}O_2$ and $LiNi_{0.85}Co_{0.15}Al_{0.05}O_2$.

20. The lithium-ion battery according to claim 1, wherein at least a part of the positive active material is monocrystal particles.

* * * * *